United States Patent Office 3,679,456
Patented July 25, 1972

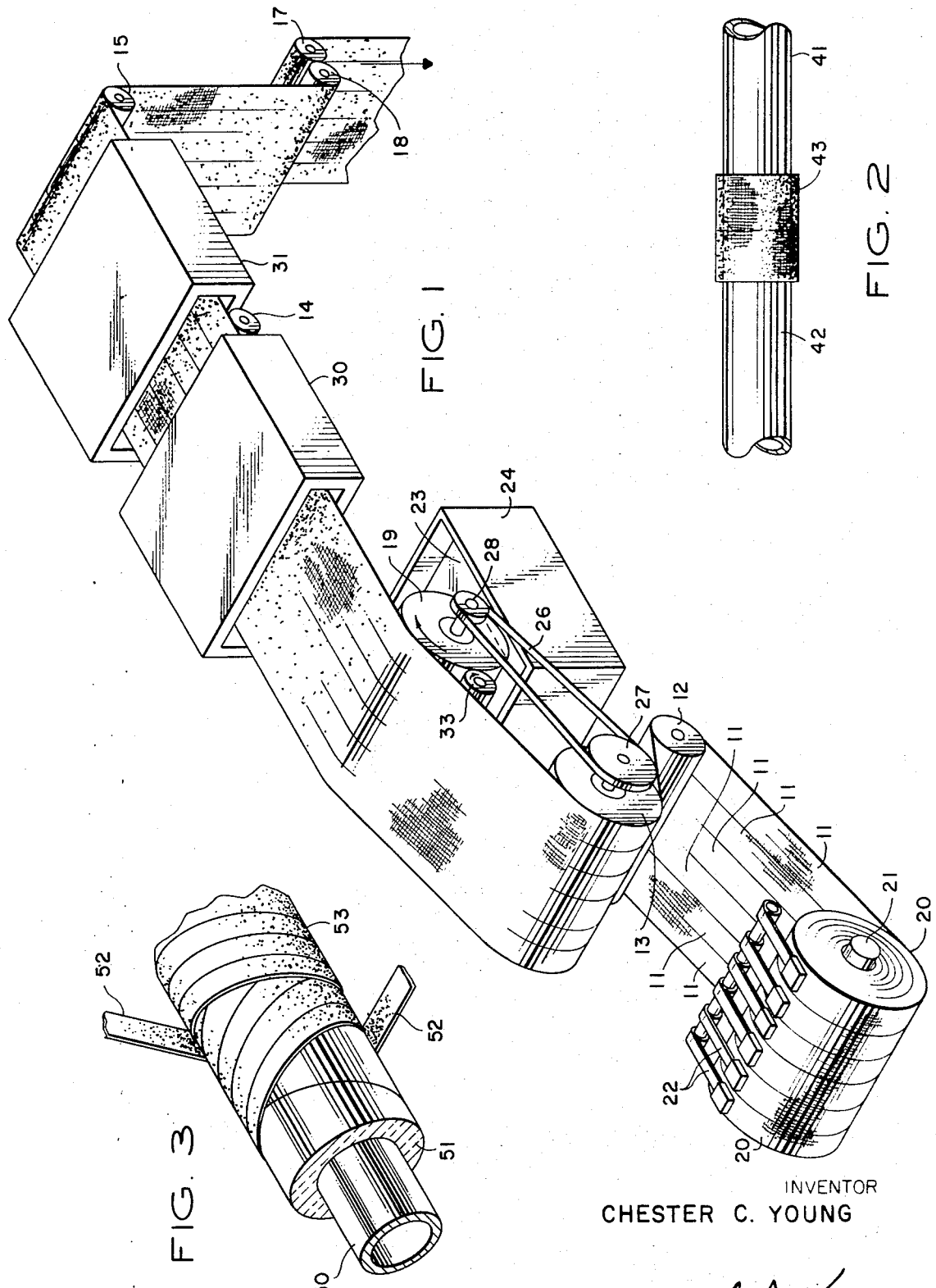

3,679,456
METHOD OF MAKING SEALING TAPES
Chester C. Young, Dallas, Tex., assignor to
Hardcast, Inc., Louisville, Ky.
Filed Apr. 1, 1970, Ser. No. 24,569
Int. Cl. B44d 1/44
U.S. Cl. 117—63      7 Claims

ABSTRACT OF THE DISCLOSURE

Disclosed is a sealing tape comprising a fabric medium impregnated with a plaster and adhesive slurry which is activated upon immersion in an adhesive-containing solution. The activated tape is used to join and seal joints of conduit and to encase insulated conduit. Methods and apparatus for making the tape are also disclosed.

---

This invention relates to adhesive sealing materials. More particularly this invention relates to methods for producing materials for joining and sealing joints of duct work made of metal, plastic, cement-asbestos, fiber or other materials.

In the construction industry sections of conduit materials, fabricated from metal or other materials such as asbestos, cement, plastics and the like, are commonly jointed to form ducts or conduits for conducting air, water and other fluids. The sections are usually joined by inserting one end of one section within the end of another section or by placing the ends of the sections in abutting relationship and the junction effectively sealed by wrapping adhesive tape around the junction. However adhesive tapes normally used for this purpose do not adhere well to dirty or oily surfaces and are generally subject to decay. Such adhesive materials tend to lose adhesive quality after long exposure to varied temperatures and therefore effective sealing of the junction is lost. Furthermore, conventional adhesive tapes do not adhere well to all materials. Accordingly the sealing tape used must be carefully selected to match the conduit material used, and extreme care must be taken to insure that the surface to which the tape is applied is free of foreign material.

Frequently such duct work must be insulated to minimize thermal changes in the fluid being conducted therethrough. The material used for providing such insulation generally must be applied after the sections are joined and installed. The sealing tape must generally be impervious to water vapor, air, or other fluids which may be conducted through the conduit or to which the joint may otherwise be exposed. The insulating material must be capable of withstanding frequent temperature changes without deterioration or aging, and in some cases must also provide a vapor barrier to prevent the insulation from becoming saturated with thermally conductive vapor or condensate.

In accordance with the present invention a plaster and adhesive impregnated guaze strip is provided which may be activated by immersion in a suitable activating solution and then applied to a conduit or the like to provide sealing of junctions. In an alternative embodiment, a plaster and adhesive impregnated strip is provided which may be wrapped around conventional insulating materials and provide a sealing jacket for same. The tape material is advantageously supplied in dry flexible form which is then activated by immersion in an adhesive-containing activating solution. Upon activation the tape is applied to the desired location and advantageously forms a tenacious bond to all conventional conduit material. The tape bonds extremely well to dirty, oily or greasy surfaces, is resistant to most corrosive agents, and resists aging and deterioration, thereby sealing the junction to which it is applied while bonding the conduit sections together. The tape may also be used as a sealing jacket to seal insulating materials applied to duct work and the like. When used in this manner the tape may be applied directly to the insulation material and forms a hard jacket which provides an effective vapor barrier which seals the insulating layer. The tape may be advantageously used by unskilled workmen under most adverse conditions and quickly hardens to provide a hard, semi-rigid, air-tight, weather proof and lasting adhesive seal. Other features and advantages of the invention will become more readily understood from the following detailed description taken in connection with the appended claims and attached drawing in which:

FIG. 1 is a schematic illustration of apparatus for producing the plaster impregnated gauze of the invention;

FIG. 2 is a diagrammatic representation of two joints of conduit joined and sealed by the tape made in accordance with the method of this invention; and FIG. 3 is a diagrammatic representation, partially in section, illustrating the use of the tape as a sealing jacket.

In the preferred embodiment of the invention, a gauze fabric is impregnated with a gypsum base slurry which is then dried to form a plaster bearing gauze tape. The gauze fabric may be any suitable loosely woven fabric such as cotton, synthetic fiber or the like.

The plaster is impregnated into and coated onto the fabric according to the method which will be described hereinafter. The plaster slurry is preferably comprised of a mixture of water, methyl alcohol, gypsum powder, a homopolymer adhesive emulsion and a substituted methyl ether of cellulose. Table I below illustrates the proportions of each component used in the preferred embodiment of the invention.

TABLE I

| Component: | Parts by wt. |
|---|---|
| Methyl alcohol | 75 |
| Water | 200 |
| Cellulose ether | 2 |
| Homopolymer adhesive | 10 |
| Gypsum powder | 500 |

In the preferred embodiment of the invention the components listed in the above table are mixed to form a slurry which is then coated onto the fabric strip. The slurry is formed by mixing the methyl alcohol, water, cellulose ether and adhesive at essentially room temperature to form a homogeneous mixture. The gypsum powder is then blended into the mixture and mixed well to form a smooth slurry.

All the components used for making the plaster slurry are generally available. Commercial grade components are satisfactory. In the preferred embodiment of the invention tap water and commercial grade methyl alcohol are used. The cellulose ether used is preferably a propylene glycol ether substituted methyl ether of cellulose. This composition may be produced by treating cellulose fibers with methyl chloride and propylene oxide. The fibrous reaction product is purified and ground to a fine powder. The product is commercially available under the trade name Methocol HG from the Dow Chemical Company of Midland, Mich.

The preferred homopolymer adhesive used in the slurry for forming the sealing tape of the invention is free-filming emulsion available commercially under the trade name Gelva Emulsion TS–30 from the Monsanto Company of St. Louis, Mo.

Referring now to FIG. 1, the method and apparatus used for impregnating the gauze strip with the slurry will be described. Gauze strips 11, in convenient widths, such as three to six inches, are drawn from supply rolls 20 over tension rolls 12, 13, 14 and 15 by draft rolls 17 and 18.

Draft rolls 17 and 18 are positioned on opposite sides of strips 11 and are pressed firmly together. Rotation of draft rolls by a power source (not shown) draws strips 11 through the entire apparatus. Finished strips 11 emerging from draft rolls 17 and 18 may be folded or rolled in lengths suitable for use.

Gauze strips 11 are supplied from individual rolls 20 which are freely carried on fixed spindle 21. Weighted shoes 22 ride on each of rolls 20 to cause slight resistance to rotation and provide tension on each individual strip 11 between supply rolls 20 and draft rolls 17 and 18. Sufficient tension should be maintained on each strip to support the strips between transfer roll 19 and tension roll 14, and between rolls 14 and 15.

The plaster slurry 23 is placed in slurry trough 24. Mounted for rotation within trough 24 is a transfer roll 19. Roll 19 preferably has a smooth surface and is mounted so that the lower portion of the roll is submerged in the slurry 23 and the top portion of the roll contacts the underside of strips 11. As transfer roll 19 rotates in slurry 23, the plaster slurry adheres to the surface thereof and is transferred to the underside of strips 11 as strips 11 pass over the surface of the transfer roll.

Tension roll 13 preferably has a roughened surface of soft rubber or the like so that the roller 13 is rotated by drawing strips 11 thereover. Roll 19 is mechanically linked with and driven by roll 13 by means of drive belt 26 interconnecting pulleys 27 and 28.

Rolls 13 and 19 are adapted to rotate at different speeds by means of pulleys 27 and 28 mounted on rolls 13 and 19, respectively. In the preferred embodiment rolls 13 and 19 have approximately the same circumference, but the circumference of pulley 27 is about one and one-half times the circumference of pulley 28. Accordingly, rolls 13 and 19 rotate at a ratio of about 1:1.5.

Since transfer roll 19 rotates faster than roll 13 (which rotates at the speed of moving strips 11) slurry adhering to the surface of transfer roll 19 is transferred from the surface of the roll 19 to the underside of strips 11. Each strip passes over the surface of the transfer roll 19 and wipes the slurry from the transfer roll onto the underside of the strip to form a uniform coating on the strips.

Since the top of transfer roll 19 is above a line connecting the tops of tension rolls 13 and 14, the strips 11 are held firmly against the top of the transfer roll 19 as they pass thereover. The surface of the transfer roll moves faster than the strips 11, therefore slurry adhering to the transfer roll 19 is pressed partially through the weave in the fabric to impregnate the fabric with a uniform coating of slurry.

The amount of slurry transferred to the strips 11 by transfer roll 19 is governed by a meter roll 33 which is positioned parallel to and spaced from transfer roll 19 on the ascending side thereof. Meter roll 33 does not contact the strips 11 and is powered by a power source (not shown) to rotate in a direction opposite to the transfer roll. Meter roll 33 may be provided with a suitable wiper to remove slurry therefrom, or may only be rotated occasionally to prevent build-up of slurry on the face thereof opposite the transfer roll 19.

Transfer roll 19 is preferably a steel roll with a smooth coating of neoprene rubber or the like to which the slurry adheres. Meter roll 33 preferably has a highly polished chrome steel surface to which the slurry does not adhere. Therefore, as the ascending side of the transfer roll 19 emerges from the slurry 23, a thick viscous coating of slurry adheres to the roll and is raised toward the strips 11. Meter roll 33 is spaced from the surface of roll 19 and meters the thickness of the slurry to a reduced uniform thickness before the slurry contacts the strips 11. It will be apparent, therefore, that the thickness of the coating placed on strips 11 can be controlled by the separation between meter roll 33 and transfer roll 19 and the speed of the surface of transfer roll 19 relative to strips 11.

Using the apparatus described above and the slurry composition set forth in Table I, meter roll 33 is spaced approximately 1/16 inch from the surface of transfer roll, thereby limiting the thickness of slurry coating on the transfer roll which contacts the strips 11 to about 1/16 inch. Since the slurry does not adhere to the meter roll, slurry removed from the transfer roll by the meter roll falls back into the slurry trough 24.

The strips 11 carrying slurry transferred from transfer roll 19 are then drawn directly into an oven 30 and are partially dried as they pass therethrough. The strips are then withdrawn from oven 30 over tension roll 14 and into oven 31 for final drying. The dried strips are then drawn over tension roll 15 and through draft rolls 17 and 18.

In the preferred embodiment of the invention, gauze strips 11 are drawn through the apparatus in FIG. 1 at a rate of about five yards per minute. Ovens 30 and 31 are each about twenty feet long and open at both ends so that gauze strips 11 may be drawn straight through the ovens without physically contacting the oven. Dry heated air is continuously passed through the first oven 30 to maintain the temperature therein at a relatively constant temperature of approximately 700° F. Likewise dry heated air is continuously passed through the second oven 31 to maintain the temperature within the oven at approximately 400° F. Dry heated air may be supplied by any conventional source (not shown) such as electric heaters or the like. Strips 11 emerge from the second oven 31 in essentially dry state and are ready for use.

The plaster and adhesive impregnated gauze prepared as described above is similar in appearance (excepting color) to plaster of Paris gauze tape generally used for orthopedic purposes. However the tape prepared as above is quite different from general orthopedic gauze tapes in that it includes a specific adhesive which is later activated by immersion in a solution to be described hereinafter.

The plaster and adhesive impregnated tape described above is activated for use by immersion in a solution comprising trichloroethylene, methyl alcohol and an adhesive emulsion copolymer of vinyl acetate and a long chain acrylate. The preferred copolymer adhesive used for the activating solution is an emulsion available commercially under the trade name Gelva Emulsion TS–100 from the Monsanto Company of St. Louis, Mo. Table II below illustrates the portions of each component used in the activating solution in the preferred embodiment of the invention:

TABLE II

| Component: | Percent by volume |
|---|---|
| Ethyl alcohol | 12.5 |
| Trichloroethylene | 2.67 |
| Copolymer adhesive | 84.82 |

The activating solution is prepared by merely mixing the above components in the proportions shown. The solution may be stored indefinitely and is immediately ready for use.

The activating solution described is advantageously adapted to permit use thereof under widely varied ambient temperature conditions. This solution has a freezing point of about 10° F. and dries quickly while forming a uniform adhesive film even at low temperatures.

The plaster and adhesive impregnated gauze strips produced as described above may be used for adjoining and sealing conduit joints and the like by immersing a roll of the gauze strip in the activating solution and then immediately applying the gauze to the joint to be sealed. No special skill is involved in applying the activating solution to the gauze strip or in applying the strip to the conduit. The tape is wetted by immersing it in the activating solution, and the wetted tape merely drawn tightly around the joint a sufficient number of turns to thoroughly cover the joint. The wet tape may be kneaded as desired to produce a smooth surface. Alternatively, the tape may be simply wrapped around the joint to be sealed and allowed to dry. The tape should, of course, be wrapped around the conduit on both sides of the junction for a sufficient distance to provide rigidity to the finished conduit after the tape has cured. The amount of wrapping required will vary with the size and type of conduit being joined.

Typical use of the product of this invention is illustrated in FIG. 2 wherein two joints of conduit 41 and 42 are shown with the ends thereof abutting and the junction sealed with several windings of tape forming a seal 43 securing the joints 41 and 42 together and sealing the junction therebetween.

The sealing tape drys rapidly to form a non-rewettable ceramic-like mass. The set tape, however, is quite different from conventional plaster of Paris tapes in that the sealing material produced as described above sets up to form a semi-rigid structure tenaciously bonded to the conduit. Although the material drys to a ceramic-like hard structure, the sealing material is somewhat resilient and will allow normal expansion and contraction of the conduit without fracturing. While drying time is dependent upon temperature and humidity conditions existing on the job site, the product formed as described above is completely dry or set within two hours under normal conditions.

While the precise chemical process involved is not fully understood, it is believed that a chemical reaction takes place involving the homopolymer adhesive and the copolymer adhesive when the plaster and adhesive impregnated tape is immersed in the activating solution. This reaction is believed to be at least partially responsible for the formation of the hard semi-rigid mass produced and for the formation of the tenacious bond to the base material.

After drying the sealing tape resembles an orthopedic cast in appearance. However, the seal is resistant to most corrosive agents, resists aging, forms an effective vapor barrier, and adheres extremely well to all conventional conduit materials.

The product produced as described above may be conveniently used by unskilled workmen to seal joints of any conventional conduit material. Thorough cleaning of the surface of the conduit material is not necessary since the sealing tape adheres extremely well to even oily or greasy surfaces.

Since the sealing tape of the invention dries to form a hard essentially rigid mass, it is particularly useful for the formation of non-standard conduit junctions by workmen in the field. For example, if a T section is required and a conventional T fitting is not available, a workman may merely form a hole in the side of a conventional joint of tubing and place the open end of another joint of tubing adjacent the hole in a loosely fitting relationship. Tape produced as described above and activated with the activating solution may then be used to wrap the loosely fitted junction and seal the open ended conduit to the hole in the first joint, thereby producing a rigid air-tight T fitting.

In an alternative embodiment of the invention the apparatus described above may be used to produce a gauze and adhesive impregnated tape which may be activated to form a jacket or encasement for insulated pipes and, the like. To produce a tape for this purpose a faster setting homopolymer adhesive is preferably substituted for the Gelva Emulsion TS-30 described above. The preferred homopolymer adhesive used in the slurry for making the jacketing tape of the alternative embodiment is a polyvinyl acetate emulsion available commercially under the trade name Gelva Emulsion S-98 from the Monsanto Company of St. Louis, Mo. This homopolymer adhesive is substituted for Gelva Emulsion TS-30 in the same proportions as set forth hereinabove in Table I. Also in the alternative embodiment it is preferred to place a thicker film of slurry on the tape 11 as it passes over transer roll 19. This may be conveniently accomplished by separating meter roll 33 and transfer roll 19 a distance of about 3/32 inch. Since the space between the meter roll and the transfer roll is larger, a thicker uniform coating of slurry is carried on transfer roll 19 and more slurry is impregnated into the tape 11 passing over the transfer roll. In all other respects the jacketing tape of the alternative embodiment is produced as described hereinabove with reference to the sealing tape.

Both the sealing tape described in the first embodiment of the invention and the jacket tape described in the alternative embodiment of the invention are activated by the same activating solution described hereinabove comprising the components in the proportions set forth in Table II. Use of the tape of the alternative embodiment as a jacketing material is illustrated in FIG. 3. The conduit 50 is first covered with any conventional insulating material 51, such as asbestos, glass fibers, rock wool or the like. The jacketing tape 52 is immersed in the activating solution and wrapped around the insulation 51 to form a jacketing layer or encasement 53 completely enclosing the conduit 50 and the insulation 51. After a sufficient coating of tape has been applied to the conduit the surface may be smoothed, if desired, and allowed to dry. A particular advantage of the tape of this invention is that it may be applied to irregularly shaped surfaces and may be used to form a uniform jacket around conventional fittings such as T fittings and the like. Furthermore, the insulating material may be applied to the duct work after it is installed by unskilled workmen. The jacket formed in accordance with this invention provides a vapor barrier over the entire section of material which has been jacketed, thereby effectively preventing moisture or other thermally conductive materials from entering the insulating material and destroying its insulating properties. Furthermore, the tape forms a hard jacket which protects the insulation from physical damage.

Coloring agents may be added to the slurry used to form the tape of the invention if desired. For example, it has been discovered that by adding lamp black to the slurry 23 used in forming the tapes of this invention in the proportion of approximately 6 ounces of lamp black for each 100 pounds of slurry, the resultant tape will have a metallic grey appearance. It will be apparent to those skilled in the art that other coloring agents which do not disadvantageously interfere with the reactions involved in setting up of the materials may be added to the slurry to produce the desired coloring effect.

The tape products described above may be made especially fire retardant by incorporating fire retarding materials in the activating solution. Care must be exercised in selecting a fire retarding agent which does not disadvantageously interfere with the properties of the other ingredients or interefere with the bonding properties of the tape.

Tapes having fire retardant qualities can be produced by adding a phosphorous-based fire retardant to the activating solution described above with reference to Table II. In the preferred embodiment, a dry powder fire retardant containing about 70% $P_2O_5$ by weight is added directly to the activating solution. An ammonium polyphosphate powder sold commercially under the trademark Phos-Chek P/30 by The Monsanto Company of St. Louis Mo. has been found suitable for this purpose. This composition is preferably added in proportions of about 2.5 pounds per gallon of solution. This fire retardant is dissolved in the solution and is thereby incorporated into the sealing tape when the dry tape is activated.

While the invention has been described with particular reference to specific embodiments thereof, it will be understood that the forms of the invention shown and described in detail are to be taken as preferred embodiments of same, and that various changes and modifications may be resorted to without departing from the spirit and scope of the invention as defined by the appended claims.

What is claimed is:

1. The method of producing an article for use in sealing junctions between conduit joints comprising the steps of:
   (a) coating a gauze strip with a plaster slurry comprising methyl alcohol, water, cellulose ether, gypsum powder, and a homopolymer adhesive;
   (b) drying said plaster slurry on said gauze strip; and
   (c) activating the coated gauze strip in a solution comprising trichloroethylene, ethyl alcohol, and a copolymer adhesive emulsion.

2. The method set forth in claim 1 wherein said plaster slurry is deposited on said gauze strip by drawing said gauze strip over a rotating roll which is partially submerged in said slurry and rotated at a speed at which the surface of said roll travels faster than the strip moving over the surface thereof, whereby slurry adhering to the surface of said roll is transferred to said gauze strip.

3. The method set forth in claim 1 wherein said plaster slurry is dried on said gauze strip by moving said strip through a first oven maintained at a temperature of about 700° F. and thereafter moving said strip through a second oven maintained at a temperature of about 400° F.

4. The method set forth in claim 3 wherein said gauze strip is maintained within each of said ovens for at least one minute.

5. The method of producing a plaster impregnated tape comprising the steps of:
   (a) partially submerging a first roll in a plaster slurry comprising methyl alcohol, water, cellulose ether, gypsum plaster, and a homopolymer adhesive;
   (b) drawing a fabric strip over the surface of said first roll at a first linear velocity;
   (c) rotating said roll to cause the surface thereof to travel at a second linear velocity which is greater than said first linear velocity, whereby slurry adhering to the surface of said first roll is transferred to said fabric strip;
   (d) heating said fabric strip coated with said slurry to a temperature of about 700° F.; and
   (e) thereafter heating said fabric strip coated with said slurry to a temperature of about 400° F.

6. The method set forth in claim 5 wherein said fabric strip is moved at a linear velocity of about 15 ft./min. and the surface of said first roll travels at a linear velocity of about 22.5 ft./min.

7. The method set forth in claim 5 wherein said first roll is driven by a second roll which is rotated by said fabric strip being drawn over and engaging the surface thereof prior to being drawn over the surface of said first roll.

References Cited
UNITED STATES PATENTS

| | | | |
|---|---|---|---|
| 2,053,728 | 9/1936 | Mienes | 128—91 |
| 3,316,901 | 5/1967 | Smith | 128—91 |
| 2,683,466 | 7/1954 | Guiles | 285—293 |
| 2,181,691 | 11/1939 | Bucy | 117—63 UX |
| 3,531,316 | 11/1966 | Sternasty | 117—122 |

MURRAY KATZ, Primary Examiner

B. D. PIANALTO, Assistant Examiner

U.S. Cl. X.R.

117—111 R, 119.6, 122 S, 136; 128—90, 91 R; 138—155; 260—17 R, 33.4 R